United States Patent [19]

Donahue et al.

[11] Patent Number: 5,359,200
[45] Date of Patent: Oct. 25, 1994

[54] RADIATION DOSIMETER

[75] Inventors: J. Michael Donahue, Oakland, N.J.; David F. Lewis, Monroe, Conn.; Sotiri A. Papoulias, Florham Park, N.J.

[73] Assignee: ISP Investments Inc., Wilmington, Del.

[21] Appl. No.: 141,173

[22] Filed: Oct. 22, 1993

[51] Int. Cl.$^5$ .................................................. G01T 1/02
[52] U.S. Cl. ................................ 250/475.2; 250/474.1
[58] Field of Search ............ 250/475.2, 479.1, 252.1 R

[56] References Cited

U.S. PATENT DOCUMENTS

| 4,499,375 | 2/1985 | Jaszczak | 250/252.1 |
| 4,527,057 | 7/1985 | Guyton et al. | 250/252.1 |
| 4,538,071 | 8/1985 | Bardoux et al. | 250/252.1 |
| 5,051,597 | 9/1991 | Lewis et al. | 250/474.1 |
| 5,084,623 | 1/1992 | Lewis et al. | 250/474.1 |

Primary Examiner—Paul M. Dzierzynski
Assistant Examiner—Drew A. Dunn
Attorney, Agent, or Firm—Richard T. Laughlin; Anthony Lagani, Jr.; Joshua J. Ward

[57] ABSTRACT

A radiation dosimeter for preparing a dosage map of a specific rotary canister of a blood radiating machine. This dosimeter includes a sandwich assembly of a first panel and a second panel and a gamma ray-sensitive film disposed therebetween, for mounting temporarily in the canister during gamma ray dosage and canister rotation.

7 Claims, 1 Drawing Sheet

RADIATION DOSIMETER

The invention generally relates to a radiation dosimeter, and in particular the invention relates to a rotary radiation dosimeter.

BACKGROUND OF THE INVENTION

In order to prevent a known type of disease, blood products are routinely exposed to gamma radiation in order to deactivate certain cells. The radiation dose to deactivate these cells is about 2500 to 5000 rads (25–50 Gy). This radiation dose is just below the level where unacceptable damage to other blood components occurs. Because the radiation dose to the blood must be accurately provided, the cylindrical radiation canister, which holds blood bags, must be accurately measured (mapped) in three dimensions using a dosimeter traceable to a known standard.

The prior art dosimeter is described in U.S. Pat. Nos. 5,051,597, issued Sep. 24, 1991, and 5,084,623, issued Jan. 28, 1992.

The prior art dosimeter includes a first ply having indicia thereon, a second ply having a radiation-sensitive zone overlying the indicia of said first ply, said radiation-sensitive zone being capable of changing opacity in response to exposure to a radiation dosage exceeding a predetermined threshold so as to change the visibility of the indicia.

One of the major problems with the prior art dosimeter is that it cannot be used for mapping the dose within the canister.

THE OBJECTS OF THE INVENTION

One of the objects of the present invention is to provide a novel radiation dosimeter for measuring a gamma ray dose throughout the volume of a cylindrical canister of a commercial radiation machine.

Another object of the invention is to provide a dosimeter for a rotary canister which receives a usually non-symmetric, averaged-out radiation dose.

A further object of the invention is to provide a dosimeter for measuring a gamma ray dose, and for processing a dosage map, of a rotary canister of a commercial radiation machine.

The foregoing and other objects, features and advantages of the invention will be apparent from the following description of the preferred embodiment of the invention as illustrated in the accompanying drawings.

SUMMARY OF THE INVENTION

According to the present invention, a novel dosimeter is provided. This dosimeter comprises a first panel, a second panel, and a radiation-sensitive media layer which is sandwiched between the first panel and the second panel and which is removable from the first and second panels for processing the media layer so that a radiation dosage map can be made.

By using the radiation-sensitive media layer, a radiation dosage map for the radiation canister can be processed.

DESCRIPTION OF THE PREFERRED EMBODIMENT

Figure 1:
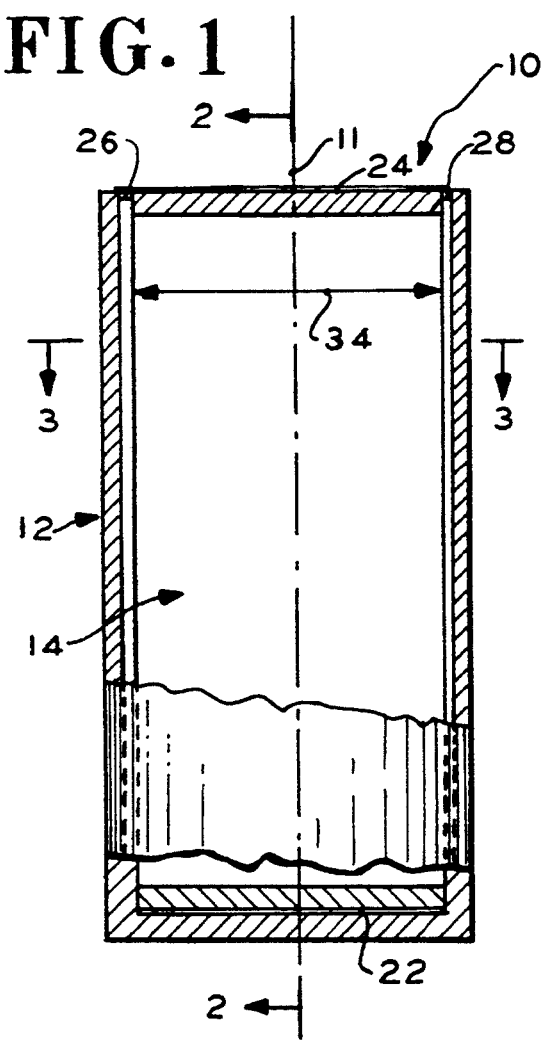
FIG. 1 is a cut-away elevation view of a radiation dosimeter and canister according to the present invention.
Figure 2:
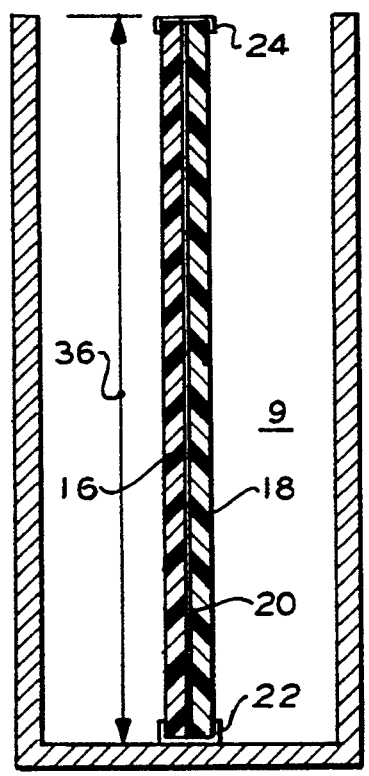
FIG. 2 is a section view as taken along the line 2—2 of FIG. 1.
Figure 3:
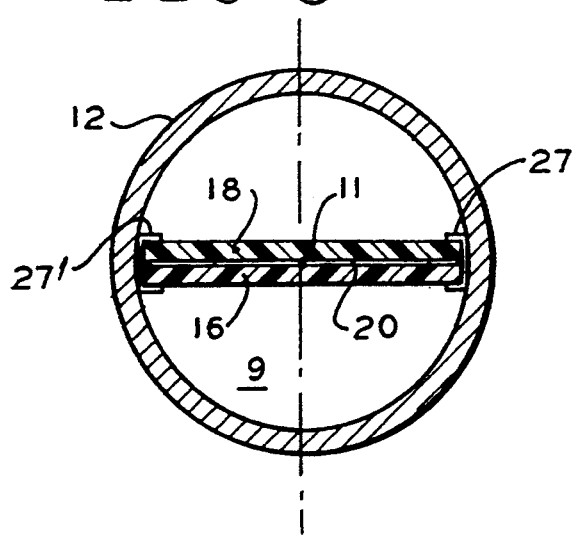
FIG. 3 is a section view as taken along the line 3—3 of FIG. 1.
Figure 4:
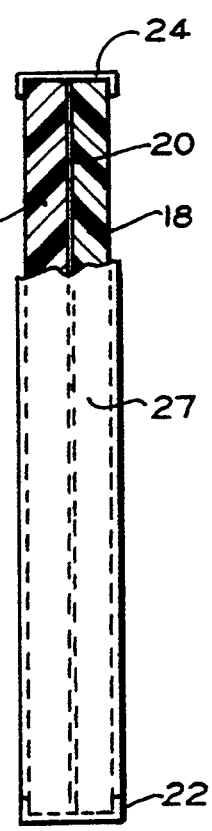
FIG. 4 is partly in section showing the side clips broken away at the upper portion.

As shown in FIGS. 1, 2 and 3, a blood radiation apparatus or equipment or assembly generally indicated at is provided. Assembly 10 has a cylinder or rotary canister 12, which has a central axis 11 and a cavity 9. A radiation dosimeter 14 is coaxially disposed in the cavity 9.

The dosimeter 14 has a first or front ply or panel 16, and has a second or rear ply on panel 18, and has a selective film or media 20, which is disposed or sandwiched between the panels 16, 18. The panels 16, 18 have a bottom clip 22 and have a top clip 24 and preferably also has side clips 27, 27' which press the panels 16, 18 together and the panels press against the media 20. Panels 16, 18 are preferably made of a plastic material. Media 20 is a variant of a media which is sold by International Specialty Products, Wayne, N.J., under the trademark GAFCHROMIC. In such a configuration, media 20 is a gamma ray-sensitive film. The clips 22, 24 and 27, 27' can be made of a metal, a plastic, or the like.

Top clip 24 is constructed to have left and right extensions or tabs 26, 28 in order to orient said dosimeter in canister 12. The tabs prevent upside-down insertion of the dosimeter into the canister. Panels 16, 18 have an overall width indicated as 34 and an overall length indicated as 36.

The dosimeter 14 has the gamma ray-sensitive film 20 sandwiched between two thick plastic outer panels 16, 18. The function of panels 16, 18 (commonly called build-up layers) is to equilibrate the electron distributions generated by the gamma rays. Panels 16, 18 are held together by the top, bottom and side clips 24, 22 and 27, 27'. Top clip 24 has tabs 26, 28 which prevent an incorrect insertion of dosimeter 14 into the canister 12. Bottom and side clips 22, 27 and 27' are sealed to panels 16 and 18 using a commercially available silicone sealing compound, thereby making the cassette watertight. The width 34 and length 36 of dosimeter 14 depend on the internal dimensions of canister 12, so that dosimeter 14 preferably has a tight fit in canister 12.

In order to simulate the presence of blood bags in the canister during the dosimetry measurement, the canister is preferably filled with a liquid such as water. If the canister has openings (holes) in its bottom, a plastic bag is inserted into the canister and used to hold both the dosimeter and the water.

In operation, canister 12 will be rotated and media 20 traces out the three-dimensional volume of canister 12. Media 20 maps out the gamma ray dose at each axially symmetric point within the volume of canister 12 or within cavity 9.

Media 20 darkens in response to gamma rays. The optical density of the material of media 20 at a specific wavelength is directly related to the gamma ray dose. An accurate calibration of the media density versus the gamma ray dose can be made according to a well-known standard.

Dosimeter 14 can be provided by a manufacturer to an organization, such as a hospital, or a blood bank, where blood is irradiated. Dosimeter 14 is placed into the organization's canister 12 and is subjected to a standard or conventional radiation cycle. Dosimeter 14 is then returned to the manufacturer for readout. To facilitate the readout, top, bottom and side clips 24, 22 and 27, 27' are removed. Media 20 is separated from the panels 16, 18. Panels 16, 18 are reusable. The optical density of media 20 is then measured in a specific wavelength band, as e function of position on media 20. Such measurement can be done using a densitometer, either manually or it can be done automatically using a computer-controlled positioning and measuring system or machine. A calibration algorithm is then applied to the measured density data, converting it to gamma ray doses. A map or graphical representation is then prepared relating to the specific irradiation/canister system.

Advantages of assembly 10 are indicated hereafter:
A) A dosimeter 14 is provided which can measure a gamma ray dose throughout the volume of a cylindrical canister 12 of a blood irradiation machine.
B) A dosimeter 14 is provided for a rotary radiation canister 12, which receives an axially non-symmetric averaged-out radiation dose.
C) A dosimeter 14 is provided which measures the dose in a radiation canister 12.
D) A dosimeter 14 is provided which is used to make a dosage map for a rotary radiation canister 12.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A radiation dosimeter system capable of measuring the intensity of radiation comprising: a watertight cassette containing
a first panel;
a second panel assembled to the first panel defining said watertight cassette; and
a removable radiation-sensitive layer which is sandwiched between the first panel and the second panel;
said watertight cassette residing in a water-filled canister that rotates.

2. The radiation dosimeter system of claim 1, wherein the first and second panels are opaque to light.

3. The radiation dosimeter system of claim 2, wherein the radiation-sensitive layer is a self-developing film capable of recording radiation doses to an accuracy of ±5%.

4. The radiation dosimeter system of claim 3, wherein the cassette is positioned along the axis of rotation of the water-filled canister.

5. The radiation dosimeter system of claim 4, wherein the cassette includes a top clip, a bottom clip and side clips respectively clamping top, bottom and side edges of the first and second panels for pressing the first and second panels together against the layer and for assembling the first and second panels together.

6. The radiation dosimeter system of claim 5, wherein the top clip has first and second tabs disposed at opposite ends of the top clip for positioning the cassette in the water-filled container.

7. A method of making a radiation dosage map for a rotating radiation canister of a blood irradiating machine, including the steps of:
forming a watertight sandwich-type dosimeter cassette including a pair of light-opaque plastic panels having therebetween a removable self-developing radiation-sensitive film;
positioning the cassette within the radiation canister coaxially along the rotation axis of the canister;
filling the canister with water;
rotating the canister;
applying radiation to the canister while it is rotating;
removing the cassette after stopping the canister rotation;
removing the radiation-sensitive film from the cassette;
measuring the optical densities of the radiation-sensitive film in a specific wavelength band as a function of position on the film; converting the optical densities to radiation dosage; and preparing a dosage map for the canister used.

* * * * *